(12) United States Patent
Lange et al.

(10) Patent No.: US 10,153,835 B2
(45) Date of Patent: Dec. 11, 2018

(54) METHOD AND SYSTEM FOR WIRELESS DATA TRANSMISSION

(71) Applicant: Deutsche Telekom AG, Bonn (DE)

(72) Inventors: Christoph Lange, Berlin (DE); Dirk Kosiankowski, Eichwalde (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 15/683,818

(22) Filed: Aug. 23, 2017

(65) Prior Publication Data

US 2018/0062740 A1 Mar. 1, 2018

(30) Foreign Application Priority Data

Aug. 31, 2016 (DE) .................. 10 2016 116 224

(51) Int. Cl.
*H04B 10/116* (2013.01)
*H04W 88/06* (2009.01)
*H04W 4/80* (2018.01)
*H04W 84/12* (2009.01)
*H04B 10/112* (2013.01)
*H04B 10/2575* (2013.01)
*H04W 4/02* (2018.01)
*H04L 29/08* (2006.01)
*H04B 10/114* (2013.01)

(52) U.S. Cl.
CPC ....... *H04B 10/1121* (2013.01); *H04B 10/116* (2013.01); *H04B 10/25758* (2013.01); *H04L 67/12* (2013.01); *H04W 4/023* (2013.01); *H04W 4/80* (2018.02); *H04W 88/06* (2013.01); *H04B 10/1143* (2013.01); *H04W 84/12* (2013.01)

(58) Field of Classification Search
CPC combination set(s) only.
See application file for complete search history.

(56) References Cited

U.S. PATENT DOCUMENTS

2004/0208591 A1* 10/2004 Willebrand ........ H04B 10/1123
398/115
2006/0200585 A1* 9/2006 Weigert ............. H04N 21/4122
709/249

(Continued)

FOREIGN PATENT DOCUMENTS

WO  WO 2015077767 A1  5/2015

*Primary Examiner* — David Payne
*Assistant Examiner* — Omar S Ismail
(74) *Attorney, Agent, or Firm* — Leydig, Voit & Mayer, Ltd.

(57) ABSTRACT

A method for wireless data transmission between a first communication device and a second communication device, wherein the first communication device acts as a data source and the second communication device acts as a data sink, includes: splitting, by the data source, data to be transmitted from the data source to the data sink into a carrier signal for a radio channel and an optical carrier signal by modulating the carrier signals; transmitting the data via a hybrid transmission path from the data source to the data sink by simultaneously transmitting some of the data via the radio channel and some of the data via a wireless optical direct channel; and merging, by the data sink, via a demodulation process, the data transmitted via the radio channel and the data transmitted via the wireless optical direct channel.

20 Claims, 2 Drawing Sheets

(56) References Cited

U.S. PATENT DOCUMENTS

| | | |
|---|---|---|
| 2009/0208219 A1 | 8/2009 | Rhodes et al. |
| 2012/0155359 A1* | 6/2012 | Peters .................... H04L 12/18 370/312 |
| 2012/0308235 A1* | 12/2012 | Pusarla .............. H04B 10/1121 398/79 |
| 2014/0072119 A1* | 3/2014 | Hranilovic ............ H04L 9/3215 380/270 |
| 2014/0248049 A1 | 9/2014 | Saint Georges |
| 2016/0249164 A1 | 8/2016 | Jovicic |

* cited by examiner

METHOD AND SYSTEM FOR WIRELESS DATA TRANSMISSION

CROSS-REFERENCE TO RELATED APPLICATIONS

Priority is claimed to German Patent Application No. DE 10 2016 116 224.8, filed on Aug. 31, 2016, the entire disclosure of which is hereby incorporated by reference herein.

FIELD

The invention relates to a solution in the telecommunications field, or, to be more specific, the transmission of digital data with a high transmission rate in a communication network. It is particularly concerned with wireless data transmission using a variety of additional transmission technologies. Exemplary embodiments of the invention include a corresponding data transmission method and a system suitable for carrying out this method.

BACKGROUND

Digital data transmission is increasingly entering all aspects of life. As a result, requirements regarding the quantities of data to be transmitted and the associated transmission speeds and data transmission rates have increased hugely in recent years. Since demand to use the corresponding data with mobile terminal devices is also rising constantly, the above-mentioned requirements are also particularly relevant for wireless data transmission. Wireless connection of terminal devices such as laptop computers, smartphones and tablets in particular has in the meantime become widespread among users of a range of radio transmission techniques, especially wireless local area network (WLAN) technology. In this context, WLAN technology offers a range of particular advantages thanks to the use of an unlicensed radio frequency spectrum, especially inside buildings, where only short distances need to be overbridged, but also in the public domain outside buildings.

Despite the considerable increase in the maximum data transmission rates available in WLAN systems thanks to updated standards, new applications have been developed in the meantime for which the available data transmission rates are no longer sufficient, or are only sufficient to a limited extent. This is particularly relevant if a plurality of users are using resources within a WLAN, as users have to share the available data transmission rate in the WLAN to a certain extent in such circumstances. One application in which the available data rate is not sufficient under certain circumstances is the use of so-called virtual reality techniques, for example. In such cases, users of mobile terminal devices receive high quality and high-resolution video information via virtual reality glasses, for example. However, if a plurality of users are using corresponding resources in a WLAN, they may possibly come up against data transmission rate limits even in WLAN networks created in accordance with the latest standards.

At present, glasses of the above-mentioned kind are often wired, preferably via a High-Definition Multimedia Interface (HDMI) cable connected to a powerful personal computer (PC) as the source of the corresponding video information. The data transmission rates required to transmit high-quality video information, especially over short distances, can easily be provided via a wired connection. However, users of virtual reality glasses via a wired connection to their PC find their movement options severely restricted within an area of undesirably small dimensions.

It is hardly surprising, therefore, that there is a desire to connect virtual reality glasses wirelessly to a PC generating data to create virtual reality and in so doing to connect wirelessly to home networks, for example, or, in other words, to transmit the video information to be provided to the virtual reality glasses wirelessly to these glasses. However, to allow the user to have a realistic experience, it is desirable to provide appropriate transmission capacities, or specifically data transmission rates, in this field, to allow wireless data transmission using rates significantly higher than those currently available.

SUMMARY

In an exemplary embodiment, the present invention provides a method for wireless data transmission between a first communication device and a second communication device. The first communication device acts as a data source and the second communication device acts as a data sink. The method includes: splitting, by the data source, data to be transmitted from the data source to the data sink into a carrier signal for a radio channel and an optical carrier signal by modulating the carrier signals; transmitting the data via a hybrid transmission path from the data source to the data sink by simultaneously transmitting some of the data via the radio channel and some of the data via a wireless optical direct channel; and merging, by the data sink, via a demodulation process, the data transmitted via the radio channel and the data transmitted via the wireless optical direct channel. Transmission over the radio channel utilizes a standardized radio carrier signal for wireless local area network (WLAN) networks. An optical transmitter of the data source is aligned relative to an optical receiver of the data sink based on WLAN positioning.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
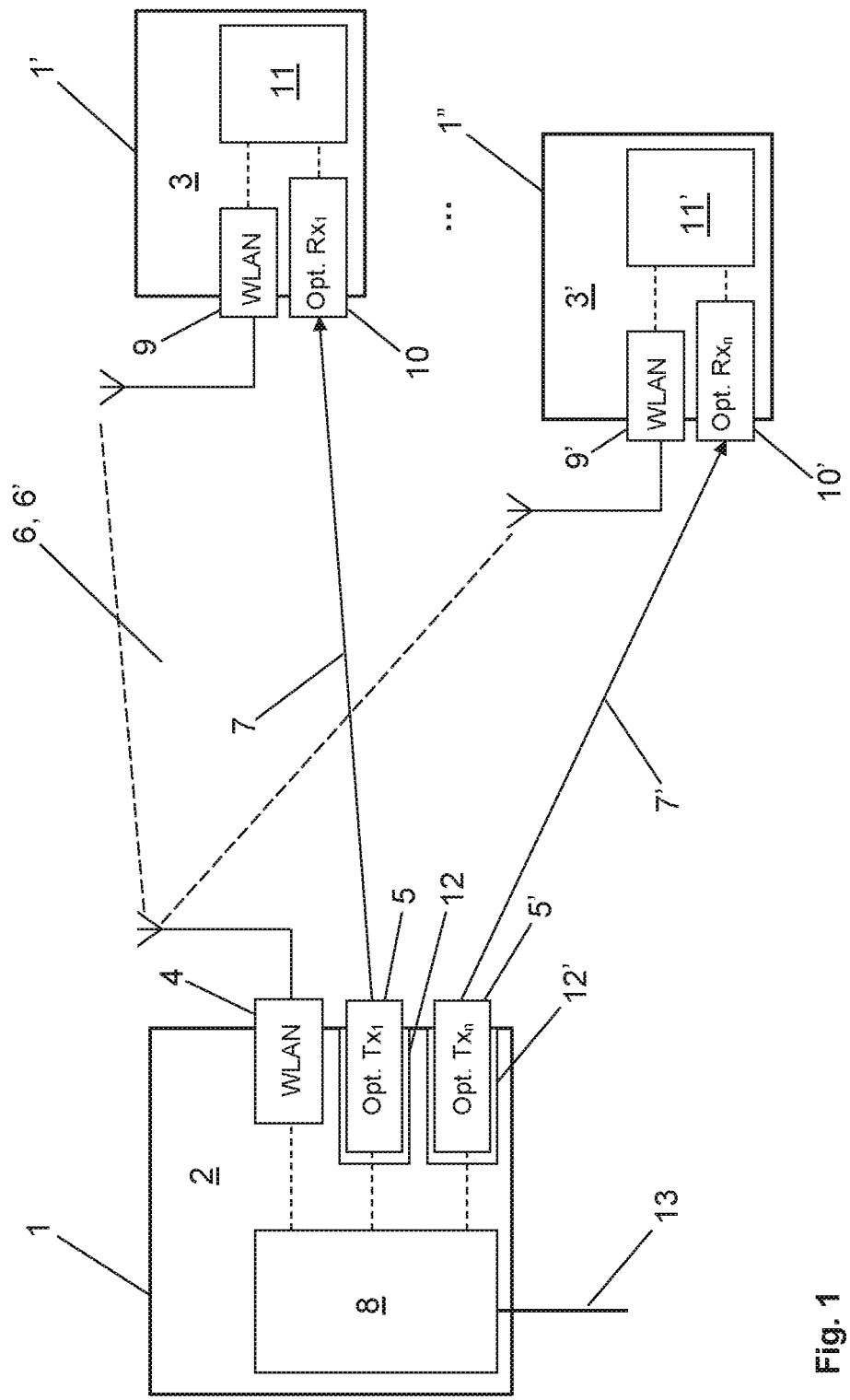
FIG. 1 is a rough schematic representation of an exemplary embodiment of a system.

Exemplary embodiments of the invention permit wireless data transmission in a close range of up to several tens of meters using data transmission rates that exceed the data transmission rates that can be achieved using established transmission techniques. Exemplary embodiments of the invention include a corresponding method and a system that is suitable for implementing the method.

In an exemplary embodiment, a method is based on wireless data transmission between at least one first and one second communication device. At least one of these communication devices is a data source, whereas at least one other communication device acts as a data sink. The method is based on a configuration in which the at least one data source and the at least one data sink are arranged such that their positions can be varied with respect to one another, although they are in direct optical visual contact. A quantity of data with user data is transmitted from the at least one data source to the at least one data sink using a hybrid transmission path. This is achieved by transmitting some of the user data from this quantity of data via a radio channel and the remainder of the user data from the above-mentioned quantity of data via a wireless optical direct channel at the same time.

In this process, the user data are split into corresponding carrier signals on the radio channel and the optical direct channel by modulation by a control module designed for this purpose for the at least one data source. After transmission to the at least one data sink, the user data are merged together again as part of the process to demodulate the carrier signals received by said data sink by a control module designed for this purpose for this data sink. The specified optical direct channel is a transmission channel forming part of the hybrid transmission path through which data are transmitted, via an optical carrier signal, from the data source to the data sink which is in direct optical visual contact with the data source (in other words without reflection by mirrors or diversion via corresponding optical components). A transmission path with carrier signals allowing data to be transmitted in an unlicensed spectrum is thus also advantageously used when implementing exemplary embodiments of the method according to the invention.

A carrier signal supplied in accordance with the WLAN Standard for networks is used for the radio channel. The communication protocols specified for the WLAN Standard are also used accordingly in the radio channel. As already explained, the at least one data source and the at least one data sink are in direct optical visual contact, but are also arranged such that their positions can be varied with respect to one another. Taking this into consideration, the WLAN radio connection established to transmit user data between said source and said sink is also used according to the invention to align the optical components of the at least one data source and the at least one data sink with respect to one another using WLAN positioning techniques and to track each other if necessary.

In accordance with a preferred embodiment of the method according to the invention, the user data in the optical direct channel are transmitted using a standardized optical carrier signal for Visual Light Communications (VLC). If the VLC Standard is mentioned in connection with this embodiment of the method, this refers specifically to the modulation method and communication protocols used in this standard. Nevertheless, based on this understanding, it is not compulsory to use an optical carrier signal with a wavelength within the wavelength range for visible light. According to this embodiment, carrier signals with wavelengths in the infrared or ultraviolet light spectrum adjacent to the visible light spectrum should preferably be used.

In a further exemplary embodiment, the user data to be transmitted via the optical direct channel from a quantity of data to be transmitted to the at least one data sink may be stored on a temporary interim basis in a buffer store formed in the data source or acting in connection with said data source for the duration of the operation to align or track the optical components of the data source or of the data source and the data sink, that is to say until a stable optical direct channel is established.

In an exemplary embodiment, a system initially comprises at least one data source and at least one data sink arranged in optical visual contact with the at least one data source, between which user data can be transmitted wirelessly. During transmission of the user data, a hybrid transmission path is formed between the at least one data source and the at least one data sink, said path comprising a radio channel and an optical direct channel. To this end the data source comprises at least one radio transmitting unit and at least one optical transmitter. Other components of the data source include a control module and an adjustment device for aligning the optical transmitter.

The at least one data sink accordingly comprises at least one radio receiving unit and an optical receiver. In addition, the at least one data sink is also equipped with a control module. The control modules in the data source and the data sink control the transmission of data between said data source and said data sink via the hybrid transmission path with respect to the way they are split between the radio channel and the optical direct channel which is used at the same time. As described in the method, the data from a quantity of data to be transmitted from the at least one data source to the at least one data sink are split by the control module of the at least one data source by modulation into corresponding carrier signals, that is to say between a radio carrier signal on the one hand and an optical carrier signal on the other hand, into the channels forming the hybrid transmission path. In connection with demodulation of the carrier signals received by the at least one data sink, the recovered user data are merged back together again by the control module of the at least one data sink for immediate output or for the purposes of any other further processing.

In addition to the above-mentioned task of splitting the data to be transmitted between the transmission channels, the control module of the at least one data source has the task of aligning the optical components with respect to one another, that is to say in particular aligning the at least one optical transmitter of the data source, using WLAN positioning, in the direction of the optical receiver of the at least one data sink and, if necessary, tracking the optical transmitter with respect to the optical receiver of the moving data sink if applicable. In addition, the at least one data sink may also have an adjustment device, specifically an adjustment device for aligning its optical receiver. In such an embodiment, a corresponding adjustment device of the at least one data sink is also controlled by its control module on the basis of WLAN positioning.

According to a preferred embodiment of the system according to the invention, the at least one data source may also be equipped with a buffer store or act in connection with such a buffer store. As already described in the method, this buffer store is intended to provide temporary interim storage for some of the data provided for transmission via the optical direct channel if, as a result of a change in position between the at least one data source and the at least one data sink, their optical components need to be realigned in the first instance to establish a stable optical transmission path. It should also be noted at this juncture that the two communication devices previously designated as the data source or the data sink respectively and between which data are transmitted, may also act simultaneously as a data source and data sink in view of the fact that data transmission of this kind usually entails bidirectional transmission in practice.

FIG. 1 is a simplified schematic representation of a possible embodiment of the system according to the invention. Key components of the system accordingly include at least two communication devices 1, 1', 1", exchanging data with one another, specifically at least one data source 2 and at least one data sink 3, 3', wherein the system shown by way of example comprises two data sinks 3, 3'. In this case it is assumed that the fixed data source 2 is a fixed access point operated inside a building and the data sinks 3, 3' are correspondingly designed terminal devices, in this case virtual reality (VR) glasses, worn by individuals located in and moving about in the room containing the access point. The access point acting as a data source 2 is connected via a data connection 13 to a PC which is not shown and generates data depicting virtual reality or another computer device (not shown) or a computer center (not shown).

In practice, there is a bidirectional data exchange between the access point and the VR glasses. However, for simplification purposes, only the transmission direction from the access point to the two sets of VR glasses is considered in the drawing, with the result that the aforementioned unambiguous connection is shown according to this viewpoint, with the access point representing the data source 2 and the VR glasses representing data sinks 3, 3'. In the embodiment shown, high data transmission rates are required, especially in the downstream direction, that is to say when transmitting data from the access point to the VR glasses, said data transmission rates being provided by the invention in a particularly advantageous manner by using an unlicensed transmission spectrum (radio and optical) for the carrier signals.

Both the data source 2, that is to say the access point, and the data sinks 3, 3', in this case the VR glasses acting as terminal devices which usually have high data requirements, are in this case designed according to the invention. The data source 2 accordingly comprises a radio transmission unit 4, two optical transmitters 5, 5', a control module 8 and an adjustment device 12, 12' for each optical transmitter 5, 5'. The components making up the two data sinks 3, 3' in each case include a radio receiving unit 9, 9', an optical receiver 10, 10' and a control module 11, 11'. When data are transmitted with a high data transmission rate, a hybrid transmission path is in each case formed between the data source 2 and each data sink 3, 3'. This comprises a channel for radio transmission (radio channel 6, 6') and an optical direct channel 7, 7' in each case, the radio path used to transmit data from the radio transmitting unit 4 of the data source 2 to both data sinks 3, 3' being logically subdivided by the use of different carrier frequencies or by corresponding addressing of the transmitted data packages, for example, into two radio channels 6, 6'.

If data are transmitted using the hybrid transmission path, the data from a respective quantity of data to be transmitted to one of the data sinks 3, 3' by the control module 8 of the data source 2 are split between the respective radio channel 6, 6' and the optical direct channel 7, 7' of the transmission path formed to the relevant data sink 3, 3'. Accordingly, some of the data are modulated to form a radio carrier signal and the remainder of the data are modulated to form an optical carrier signal using VLC under the control of the control module 8. The signals entering a data sink 3, 3', that is to say VR glasses worn by a user moving in the room in question, via the hybrid transmission path are received in said sink via the radio receiving unit 9, 9' on the one hand and the optical receiver 10, 10' on the other hand, and the user data signals are merged to form the optical output for the respective VR glasses after demodulation of the corresponding carrier signals under the control of the control module 11, 11' of the data sink 3, 3'.

Before the data are transmitted to one of the data sinks 3, 3' using the hybrid transmission path, the corresponding optical transmitter 5, 5' of the data source 2 is, if necessary, initially aligned with respect to the optical receiver 10, 10' of the relevant data sink 3, 3', by its control module 8. This alignment is then retained during the data transmission process by ensuring that the optical transmitter 5, 5' tracks the corresponding optical receiver 10, 10' of the data sink 3, 3' which may in some cases be moving. To this end, the relative position of the data sink 3, 3' with respect to the data source 2 is established using WLAN positioning and thereafter the optical transmitter 5, 5' is aligned accordingly, controlled by of the control module 8 of the data source 2 via an appropriate adjustment device 12, 12'. The optical direct channel 7, 7' is always used in addition to the radio channel 6, 6' designed in accordance with the WLAN Standard whenever there is a correspondingly high demand (if a terminal device, for example VR glasses, has a correspondingly high data requirement) with regard to the data transmission rate. This usually applies if VR content is transmitted to one of the data sinks 3, 3' or to a set of VR glasses respectively. If this is not the case, data may be transmitted purely by using the radio channel 6, 6' in the meantime in some cases. The radio channel 6, 6' is used both to transmit control data, for example to transmit localization data to align the optical transmitter(s) 5, 5' of the data source 2 and to transmit user data.

Figure 2:
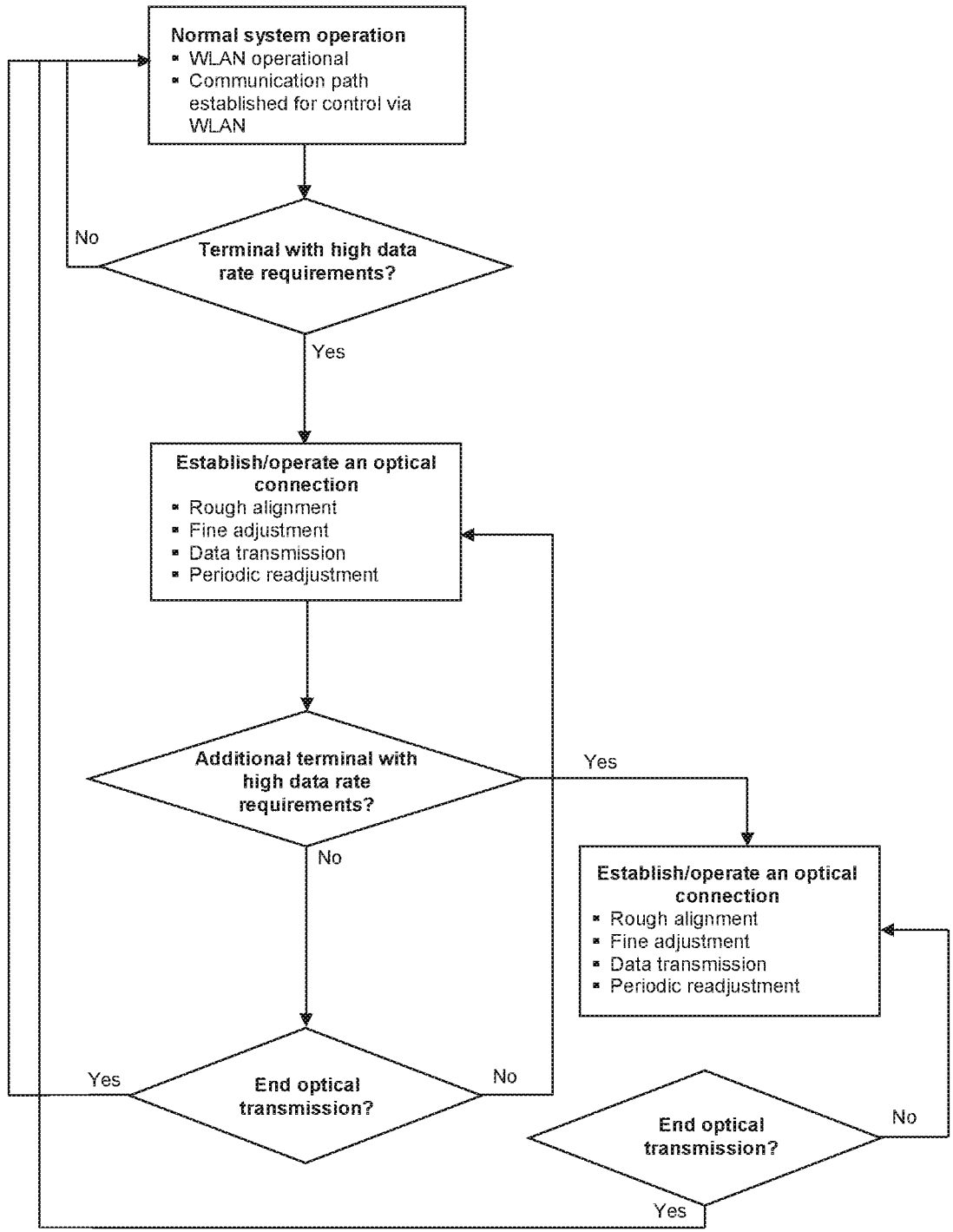
FIG. 2 is a diagram showing an exemplary sequence of a method according to an exemplary embodiment of the invention.

FIG. 2 shows an exemplary sequence for data transmission using a method according to an exemplary embodiment of the invention and using the system according to FIG. 1. Accordingly, at least one WLAN radio connection is established between the data source 2 and the two data sinks 3, 3' during normal operation of the system. If one of the data sinks 3, 3', specifically one of the communication devices 1', 1" (terminal devices) in the form of VR glasses, requires a higher data transmission rate, an optical direct channel 7, 7' is established in addition to the existing radio channel 6, 6' to this data sink 3, 3', and a hybrid transmission path is thus created between this data sink 3, 3' and the data source 2. To this end, under the control of the control module 8 of the data source 2, in the access point in this example, the selected optical transmitter 5, 5' of the data source 2 selected for optical transmission of data to the relevant data sink 3, 3' is aligned accordingly. This alignment takes place using WLAN positioning, through which the relative position of the data sink 3, 3' with respect to the data source 2 is established and an initial rough alignment is carried out on this basis, followed by fine adjustment of the optical transmitter 5, 5' of the data source 2. If necessary, for example if the individual wearing the VR glasses is moving while wearing these glasses, a readjustment of the optical transmitter 5, 5' is carried out in each case, and this remains in operation as long as the data transmission rate needs to be correspondingly high.

Optical connections are established and operated in accordance with the number of sets of VR glasses (in the room). As soon as one of the sets of VR glasses terminates the demand for a correspondingly high data transmission rate, the number of optical connections is reduced accordingly.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for wireless data transmission between a first communication device and a second communication device, wherein the first communication device acts as a data source and the second communication device acts as a data sink, wherein the data source and the data sink are configured to be arranged in variable positions with respect to one another and in direct optical visual contact, and wherein the method comprises:
    splitting, by the data source, user data to be transmitted from the data source to the data sink into user data to be transmitted via a radio channel and user data to be transmitted via a wireless optical direct channel;
    aligning an optical transmitter of the data source relative to an optical receiver of the data sink based on wireless local area network (WLAN) positioning;
    transmitting the user data via a hybrid transmission path from the data source to the data sink by simultaneously transmitting the user data to be transmitted via the radio channel by modulating a carrier signal for the radio channel and transmitting the user data to be transmitted via the wireless optical direct channel by modulating an optical carrier signal; and
    merging, by the data sink, via a demodulation process, the user data transmitted via the radio channel and the user data transmitted via the wireless optical direct channel to provide merged transmitted user data,
    wherein transmission over the radio channel utilizes a standardized radio carrier signal for networks.

2. The method according to claim 1, wherein the optical carrier signal is standardized for Visible Light Communications (VLC), and wherein the optical carrier signal has a wavelength within the wavelength range for visible light, the infrared spectrum, or the ultraviolet spectrum.

3. The method according to claim 1, wherein the user data to be transmitted via the optical direct channel is stored in interim storage in a buffer store of the data source until a stable optical direct channel is formed as part of the hybrid transmission path to the data sink.

4. A system for wireless data transmission, comprising:
    a first communication device; and
    a second communication device;
    wherein the first communication device acts as a data source and the second communication device acts as a data sink;
    wherein the first and second communication devices are configured to form a hybrid transmission path between the data source and the data sink when transmitting data, the hybrid transmission path comprising a radio channel in accordance with the wireless local area network (WLAN) standard and an optical direct channel;
    wherein the data source comprises a radio transmitter, an optical transmitter, and an adjustment device for aligning the optical transmitter;
    wherein the data sink comprises a radio receiver and an optical receiver;
    wherein the data source is configured to split user data to be transmitted from the data source to the data sink into user data to be transmitted via the radio channel and user data to be transmitted via the optical direct channel, to transmit the user data to be transmitted via the radio channel by modulating a carrier signal for the radio channel, to transmit the user data to be transmitted via the optical direct channel by modulating an optical carrier signal, and to control the adjustment device for the data source to align the optical transmitter of the data source to the optical receiver of the data sink based on WLAN positioning; and
    wherein the data sink is configured to merge the user data transmitted via the radio channel and the user data transmitted via the optical direct channel back together after demodulation of the respective carrier signals to provide merged transmitted user data.

5. The system according to claim 4, wherein the system further comprises a buffer store for interim storage of user data to be transmitted via the optical transmitter.

6. The system according to claim 5, wherein the buffer store is part of the data source.

7. The system according to claim 5, wherein the buffer store is configured to act in connection with the data source.

8. The method according to claim 1, wherein aligning the optical transmitter of the data source relative to the optical receiver of the data sink based on WLAN positioning includes determining a relative position of the data sink with respect to the data source.

9. The method according to claim 8, wherein aligning the optical transmitter of the data source relative to the optical receiver of the data sink based on WLAN positioning further includes establishing an initial rough alignment based on the relative position of the data sink with respect to the data source.

10. The method according to claim 9, wherein aligning the optical transmitter of the data source relative to the optical receiver of the data sink based on WLAN positioning is followed by a fine adjustment of the optical transmitter of the data source.

11. The method according to claim 1, wherein the optical receiver is moving, the method further comprising tracking the optical transmitter of the data source with respect to the moving optical receiver.

12. The method according to claim 1, wherein the data source and the data sink are configured to form the hybrid transmission path while in relative motion with respect to one another.

13. The method according to claim 1, wherein the merged transmitted user data forms user-comprehensible output data.

14. The method according to claim 1, wherein a single WLAN radio connection is used for transmitting the user data to be transmitted via the radio channel and for aligning the optical transmitter of the data source relative to the optical receiver of the data sink.

15. The system according to claim 4, wherein the data source is configured to control the adjustment device for the data source to align the optical transmitter of the data source to the optical receiver of the data sink based on WLAN positioning by determining a relative position of the data sink with respect to the data source.

16. The system according to claim 15, wherein the data source is further configured to control the adjustment device for the data source to align the optical transmitter of the data source to the optical receiver of the data sink based on WLAN positioning by establishing an initial rough alignment based on the relative position of the data sink with respect to the data source.

17. The system according to claim 16, wherein the data source is further configured to control the adjustment device for the data source to align the optical transmitter of the data source to the optical receiver of the data sink by a fine adjustment of the optical transmitter of the data source.

18. The system according to claim 4, wherein the data source and the data sink are configured to form the hybrid transmission path while in relative motion with respect to one another.

19. The system according to claim 4, wherein the merged transmitted user data forms user-comprehensible output data.

20. The system according to claim 4, wherein a single WLAN radio connection is used for transmitting the user data to be transmitted via the radio channel and for aligning the optical transmitter of the data source relative to the optical receiver of the data sink.

* * * * *